United States Patent [19]
Koda

[11] Patent Number: 6,025,886
[45] Date of Patent: Feb. 15, 2000

[54] SCENE-CHANGE-POINT DETECTING METHOD AND MOVING-PICTURE EDITING/DISPLAYING METHOD

[75] Inventor: Eriko Koda, Kawasaki, Japan

[73] Assignee: Hitachi, Ltd., Tokyo, Japan

[21] Appl. No.: 08/914,810

[22] Filed: Aug. 20, 1997

[30] Foreign Application Priority Data

Aug. 20, 1996 [JP] Japan .................................... 8-218895

[51] Int. Cl.[7] .................................................. H04N 7/32
[52] U.S. Cl. ................................. 348/700; 386/4; 386/52
[58] Field of Search .................................... 348/700, 701; 386/4, 52; H04N 7/32

[56] References Cited

U.S. PATENT DOCUMENTS 5,642,174 6/1997 Kazui ....................................... 348/700

*Primary Examiner*—Howard Britton
*Attorney, Agent, or Firm*—Antonelli, Terry, Stout & Kraus, LLP

[57] ABSTRACT

A method, apparatus and computer program for detecting a scene change point in a moving picture which has been coded according to a moving-picture coding process. The moving picture coding process divides the processing picture into a plurality of pictures. Each picture is divided into a plurality of blocks each being compressed by an encoder. The encoder operates according to a selected one of three compression techniques, namely an intra-picture compression technique, a differential-picture compression technique or a skipped-block compression technique. The invention counts the number of blocks of each picture subjected to the compression techniques, records the counts as user data, and analyzes the counts stored in the user data in a decoding operation in order to detect a scene change point of the moving picture.

26 Claims, 10 Drawing Sheets

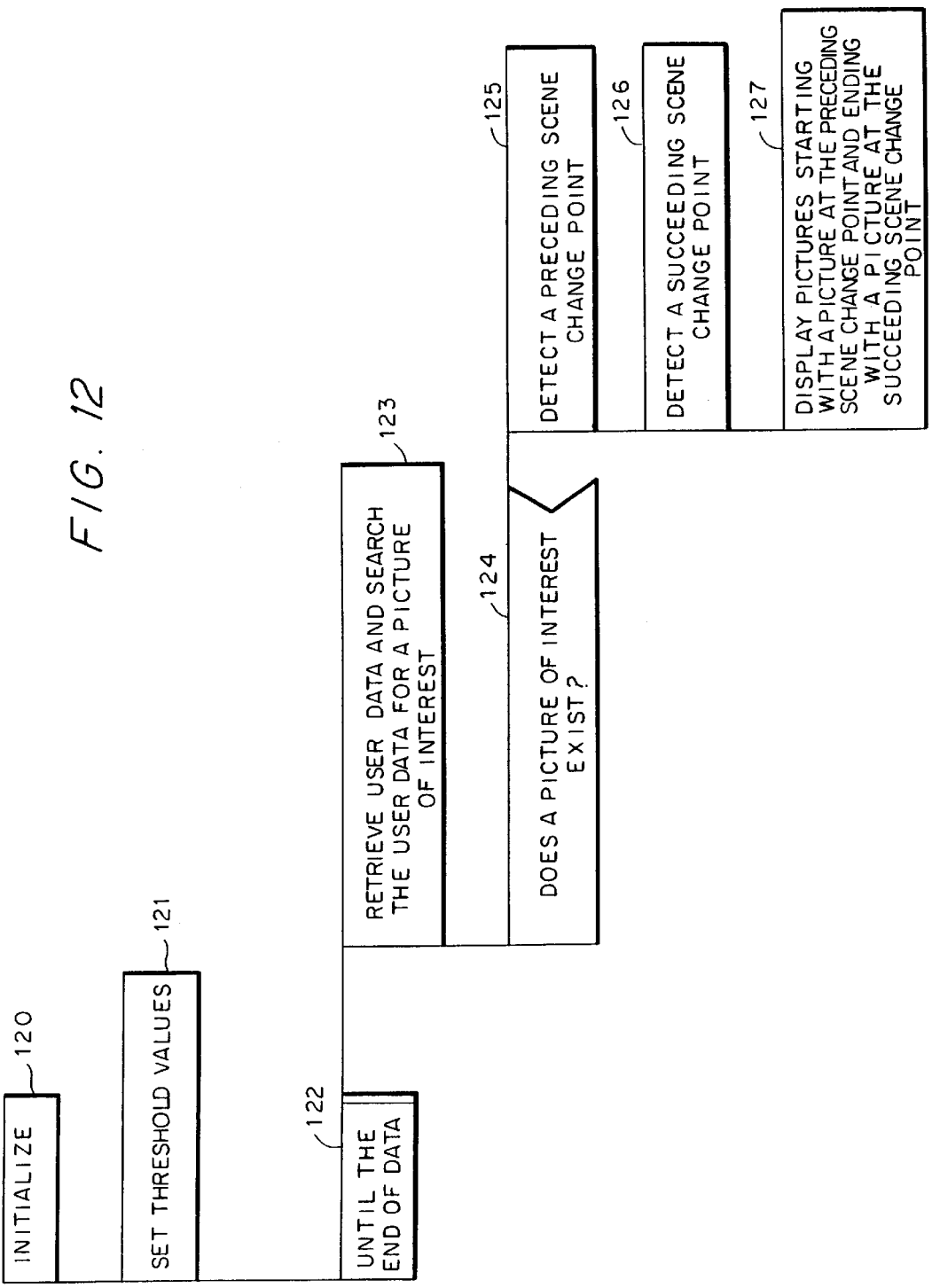

SCENE-CHANGE-POINT DETECTING METHOD AND MOVING-PICTURE EDITING/DISPLAYING METHOD

BACKGROUND OF THE INVENTION

The present invention relates to a scene-change-point detecting method, apparatus and computer program. More particularly the present invention relates to a scene-change-point detecting method, apparatus and computer program for detecting a scene change point in a moving-picture encoding system so as to find the beginning (head) of a compressed/coded video signal or video data for each scene and a moving-picture editing/displaying method, apparatus and computer program for editing and displaying a moving picture by using the scene-change-point detecting method, apparatus and computer program.

Since a digital video signal has a large amount of data, a secondary storage device is required for handling video data extending over a long period of time. For this reason, in recent years, a Moving Picture Experts Group (MPEG) format is proposed and used as a system for reducing the amount of video data by compressing a digital moving picture. Details of this format are disclosed in International Standards for Multimedia Coding, by H. Yasuda, Maruzen publishing, 1991 or ISO/IEC International Standard. Information Technology-Generic Coding of Moving Pictures and. Associated Audio for Digital Storage Media at up to about 1.5 Mbit/s, 1993.

According to the MPEG, a picture is compressed by using three techniques: intra-picture compression for producing an "I" picture (Intra-Picture), a forward-predicted compression for producing a "P" picture (Predictive-Picture) and a forward/backward-predicted compression for producing a "B" picture (Bidirectionally Predictive-Picture). An "I" picture is divided into blocks each comprising 16×16 picture elements. A Discrete Cosine Transformation (DCT) is carried out for each block. The DCT concentrates picture information on coefficients of low-frequency components. The values are further quantized by considering the fact that the sense of sight of a human being is dim to the high-frequency components. Information compressed by using these two processings is then coded by using the Huffman table.

A "P" picture is produced by carrying out differential-picture compression with reference to a timewise preceding "I" picture or "P" picture and a timewise succeeding "I" picture or "P" picture. First of all, a picture to be compressed is divided into blocks each comprising 16×16 picture elements. Then, either intra-picture compression, differential-picture compression or no data compression (or skipped compression) is selected for each of the blocks. The intra-picture compression is compression in a block carried out in the same way as that for producing an "I" picture. In the differential-picture compression, motion compensation is carried out on the image of a block to be compressed with respect to the picture elements of the reference picture, allowing a motion compensating vector to be determined. If the motion compensating vector is the same as that of a block preceding the block to be compressed, the data of the block to be compressed can be skipped.

A "B" picture is produced by differential-picture compression with reference to a timewise preceding "I" picture or "P" picture and a timewise succeeding "I" picture or "P" picture. Much like a "P" picture, the picture to be compressed is divided into blocks each comprising 16×16 picture elements. Then, either intra-picture compression, differential-picture compression or no data compression (or skipped compression) is selected for each of the blocks. The selection is carried out in the same way as a "P" picture. The MPEG allows the compression performance to be enhanced by using such differential-picture compression among pictures.

There is a conventional technology for extracting change points of a digital moving picture. The conventional technology is used for moving-picture editing and finding the head of a scene. Since a compressed moving picture is a picture having differential information as described above, the conventional technology can not be applied to such a compressed moving picture as it is.

There has been proposed a method for extracting change points of data to be compressed which includes typically the steps of: creating a reduced picture of each compressed picture by using only an average value of small block units of the compressed picture, finding correlation values of luminance and chrominance histograms in the same way as the ordinary picture processing for the reduced picture, and detecting a scene change point from variations in correlation value along the time axis.

Details of the above described method are disclosed in Japanese Patent Laid-open No. Hei 6-231254. This method offers a merit of a processing speed higher than that of a method whereby compressed moving-picture data is completely decoded before extracting change points.

In another method, a scene change is detected from the coding quantity of a compressed picture during compression of the picture. Details of this method are disclosed in Japanese Patent Laid-open No. Hei 6-133305. According to this method, a scene change point can be detected with ease while a picture is being compressed.

In the former method whereby correlation values of luminance and chrominance histograms are found by using only an average value of small block units, since picture processing is carried out in the extraction of a change point after simplified decoding, scene detection takes a long time, making it difficult to detect a change point quickly.

The latter method whereby the quantity of coding is compared with that of the preceding picture is, on the other hand, effective for compression of using only an "I" picture such as the case with the motion Joint Picture Experts Group (JPEG). However, the method can not be applied to the MPEG wherein the adopted coding technique varies from block to block.

SUMMARY OF THE INVENTION

An object of the present invention to provide a scene-change-point detecting method, apparatus and computer program and a moving-picture editing/displaying method, apparatus and computer program capable of automatically extracting a scene change from a moving picture and editing, displaying as well as searching a moving picture with ease.

In order to achieve the object described above, the present invention provides a scene-change-point detecting method, apparatus and computer program for detecting a scene change point in a moving picture coded according to a moving-picture coding process. The moving-picture coding process codes the moving picture by dividing the moving picture into groups of pictures each having a first picture to undergo intra-picture compression, a plurality of second pictures each to undergo forward differential-picture compression wherein differences from a timewise preceding encoded picture are compressed and a plurality of third pictures each to undergo forward/backward differential-picture compression wherein differences from a timewise preceding encoded picture and a timewise succeeding encoded picture are compressed; dividing each of the pictures into blocks each having a predetermined size; and encoding each of the blocks by one of the intra-picture compression, the forward differential-picture compression and the forward/backward differential-picture compression.

The scene-change-point detecting method, apparatus and computer program includes the steps of or performs the functions of: counting the number of blocks in a picture completing the differential-picture compression, the number of blocks in the picture completing the intra-picture compression and the number of blocks in the picture completing no compression; and detecting a scene change point for a number of blocks constituting the picture by using the block counts. It should be noted that the group of picture is also referred to hereafter simply as a GOP.

In addition, in the scene-change-point detecting method, apparatus and computer program, information required in detection of a scene change point derived from the number of blocks in a picture completing the differential-picture compression, the number of blocks in the picture completing the intra-picture compression and the number of blocks in the picture completing no compression, is recorded as user data.

Further, in order to achieve the object described above, the present invention provides a moving picture editing/displaying method, apparatus and computer program for editing and displaying a moving picture by decoding, editing and displaying a stored, compressed and coded moving picture. The moving-picture editing/displaying method, apparatus and computer program includes the steps of or performs the functions of: storing a picture position specified in the moving picture, if any, as user data; searching the user data for the specified picture position in a process of decoding the stored, compressed and coded moving picture; detecting a scene change point preceding the picture position and a scene change point succeeding the picture position by using a scene-change-point detecting method, apparatus and computer program; and displaying pictures starting with a picture at the scene change point preceding the picture position and ending with a picture at the scene change point succeeding the picture position.

BRIEF DESCRIPTION OF THE DRAWINGS

The present invention will be more apparent from the following detailed description, when taken in conjunction with the accompanying drawings, in which:

FIG. 12 is a flowchart of processing carried out by the second embodiment to detect a scene change point of a moving picture by using the data format shown in FIG. 11.

DETAILED DESCRIPTION OF THE PREFERRED EMBODIMENTS

The present embodiment will become more apparent from the following detailed description of some preferred embodiments with reference to accompanying diagrams showing the embodiment.

First Embodiment

Figure 1:
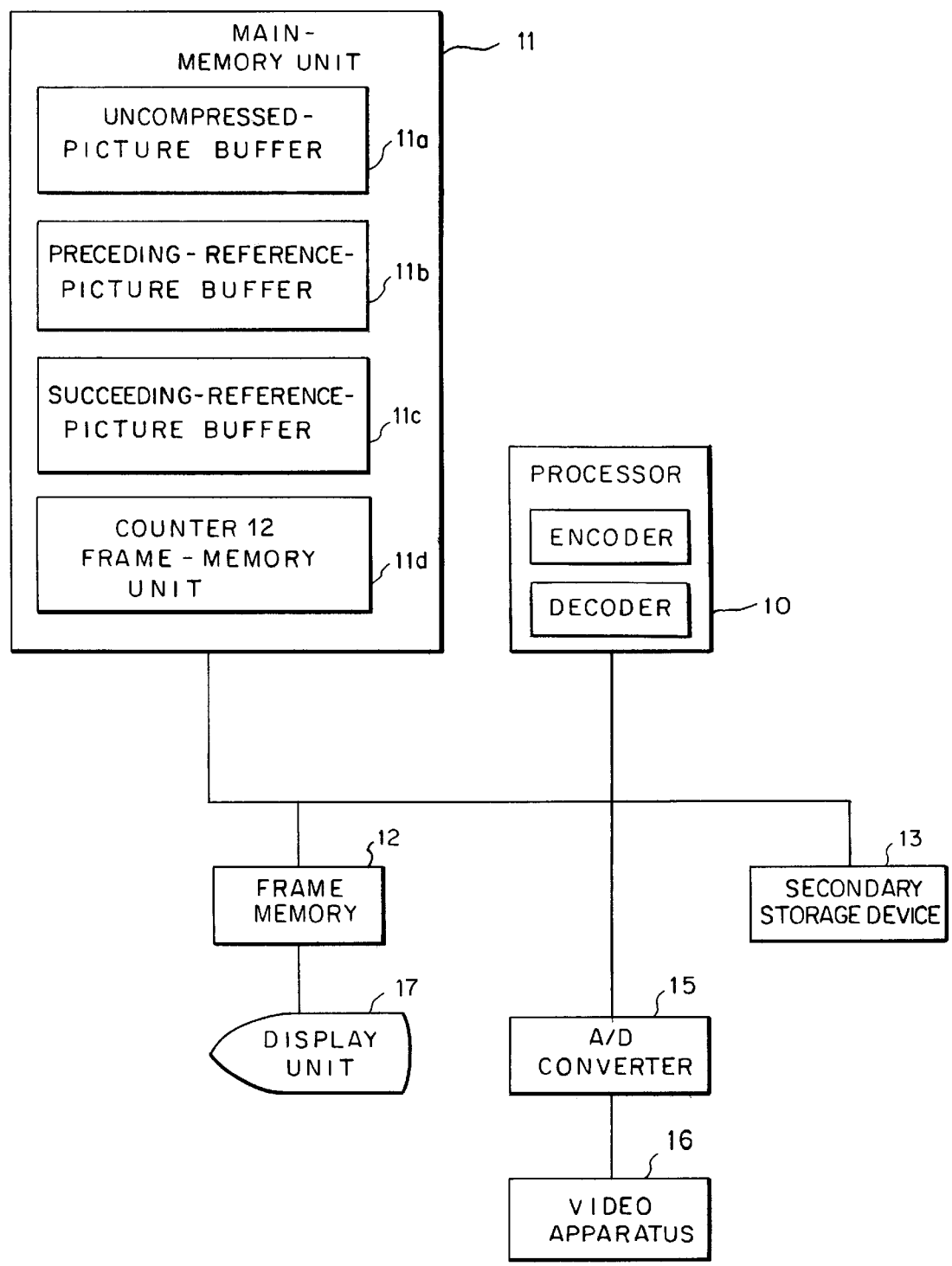
FIG. 1 is a block diagram illustrating the hardware configuration of a moving-picture compressing system provided by a first embodiment of the present invention.

FIG. 1 is a block diagram showing the hardware configuration of a moving-picture compressing system provided by a first embodiment of the present invention. Reference numeral 10 shown in tile FIG. 1 is a processor for controlling operations of other apparatuses employed in the moving-picture compressing system. The processor 10 executes the control in accordance with a program stored in a main-memory unit 11. The main-memory unit 11 includes an uncompressed-picture buffer 11a, a preceding-reference-picture buffer 11b, a succeeding-reference-picture buffer 11c and a counter 11d. Reference numeral 16 is a video apparatus for playing back an analog video signal and reference numeral 15 is an A/D converter for converting an analog signal output by the video apparatus 16 into a digital signal to be supplied to an encoder 14 which may be provided by software executable by the processor 10. The encoder 14 may also be provided by hardware separate from the processor 10. The hardware may take the form of a circuit board having various integrated circuit chips or a single integrated circuit chip.

The encoder 14 uses the uncompressed-picture buffer 11a, the preceding-reference-picture buffer 11b and the succeeding-reference-picture buffer 11c of the main memory unit 11 for carrying cut compression encoding on an input picture and stores the result of the compression encoding in a file in a secondary storage device 13. The digital signal output by the A/D converter 15 is stored in a frame-memory unit 12. A picture stored in the frame memory unit 12 is displayed on a display unit 17. The result of the compression encoding carried out by the encoder 14 which was once stored in the file in the secondary storage device 13 is decoded by a decoder 18 before being displayed on the display unit 17 through the frame-memory unit 12. The decoder 18 may be provided by software executable by the processor 10. The decoder 18 may also be provided by hardware separate from the processor 10. The hardware may take the form of a circuit board having various integrated circuit chips or a single integrated circuit chip.

Figure 2:
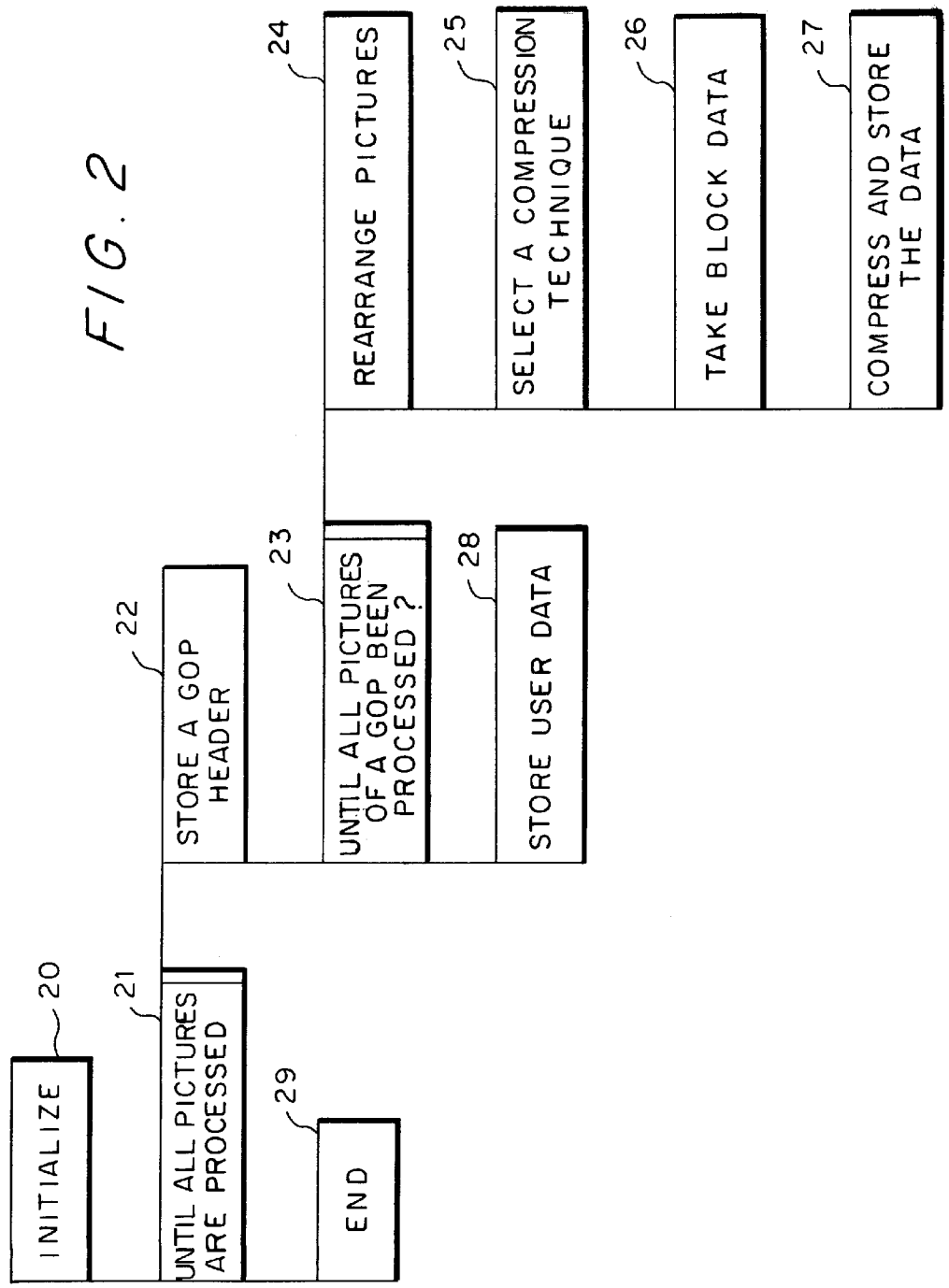
FIG. 2 is a flowchart of a picture compression processing carried out by the first embodiment.

FIG. 2 is a flowchart of a picture compression processing carried out by the present embodiment. First of all, an outline of the processing provided by the present invention is explained. The flowchart begins with a step 20 at which a driver program stored in a main-memory unit 11 used for controlling the encoder 14 is invoked and a file in the secondary storage device 13 for storing a compressed picture is opened. Then, the header of a moving picture is stored in the file in the secondary storage device 13. The processing flow then goes on to a step 21 to form a judgment as to whether or not the operation to input moving pictures is completed. Processings of steps 22 to 28 are carried out until moving picture data is all processed.

At a step 22, a Group of Pictures (GOP) header is created and stored in the file in the secondary storage device 13. Then, processings of the steps 24 to 27 are carried out on a number of pictures constituting a GOP. At the step 24, pictures are rearranged one after another in an order prescribed by the encoder 14. The processing is carried out by changing the compression order in accordance with the compression technique of the pictures. The processing flow then goes on to the step 25 at which a compression technique is selected. Compression is carried out by dividing an input picture into blocks. The compression technique for each block can be one of three compression techniques: intra-picture compression, differential-picture compression and skipped-block compression. In the intra-picture compression, compression is carried out within a block while, in the differential-picture compression, differences from a preceding or succeeding picture are found and only the differences are compressed. As for the skipped-block compression, the block contains no data to be compressed at all. That is to say, the block is skipped.

Pictures produced by the compression techniques described above are given as follows:

(1) "I" picture: Produced by intra-picture compression.

(2) "P" picture: Produced by differential-picture compression, intra-picture compression or skipped block compression.

(3) "B" picture: Produced by differential-picture compression, intra-picture compression or skipped block compression.

The encoder 14 selects one of the compression techniques described above. The number of times a compression technique has been selected so far is counted for each picture and the count is stored in a counter 11d existing in the main memory unit 11. The processing flow then proceeds to the step 26 at which block data is read out by the encoder 14 from the video apparatus 16. The processing flow then continues to the step 27 at which data compressed by the encoder 14 is written into the file in the secondary storage device 13. If the processing has been carried-out on a number of pictures constituting a GOP, the processing flow proceeds to a step 28 at which the contents of the counter 11d in the main-memory unit 11 are stored in the file in the secondary storage device 13 as user data. If all pictures have been input from the video apparatus 16, the processing flow goes on to a step 29 at which the file in the secondary storage device 13 is closed.

The steps of the above-described picture compression processing illustrated by the flowchart of FIG. 2 can be divided between the encoder and the operations performed by the processor 10 according to two different options. The first being where the encoder 14 generates compressed picture data including the user data and the second being where the encoder 14 generates compressed picture data and information which can be used to generate user data. The information used for generating user data is provided to the driver program which generates user data based on the information.

Next, the processings carried out at steps 24 to 27 are each explained in detail.

Figure 3:
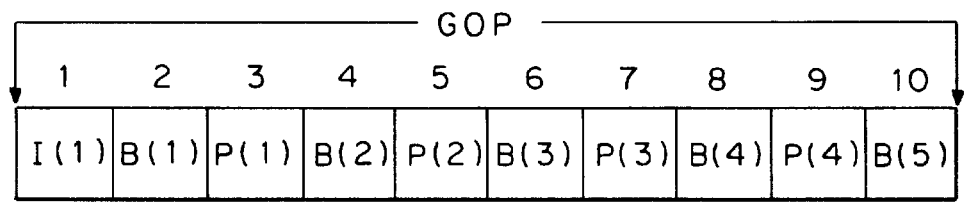
FIG. 3 is a diagram illustrating the format of a GOP comprising pictures to be coded.

FIG. 3 is a diagram illustrating the format of a GOP comprising pictures to be coded. The example illustrated in FIG. 3 is a GOP comprising 10 pictures, that is, I(1), B(1) to B(5) and P(1) to P(4). In this embodiment, the pictures are input in an order indicated by numbers added above the pictures. The pictures will be decoded in the same order but compressed in an order to be described later.

Figure 4:
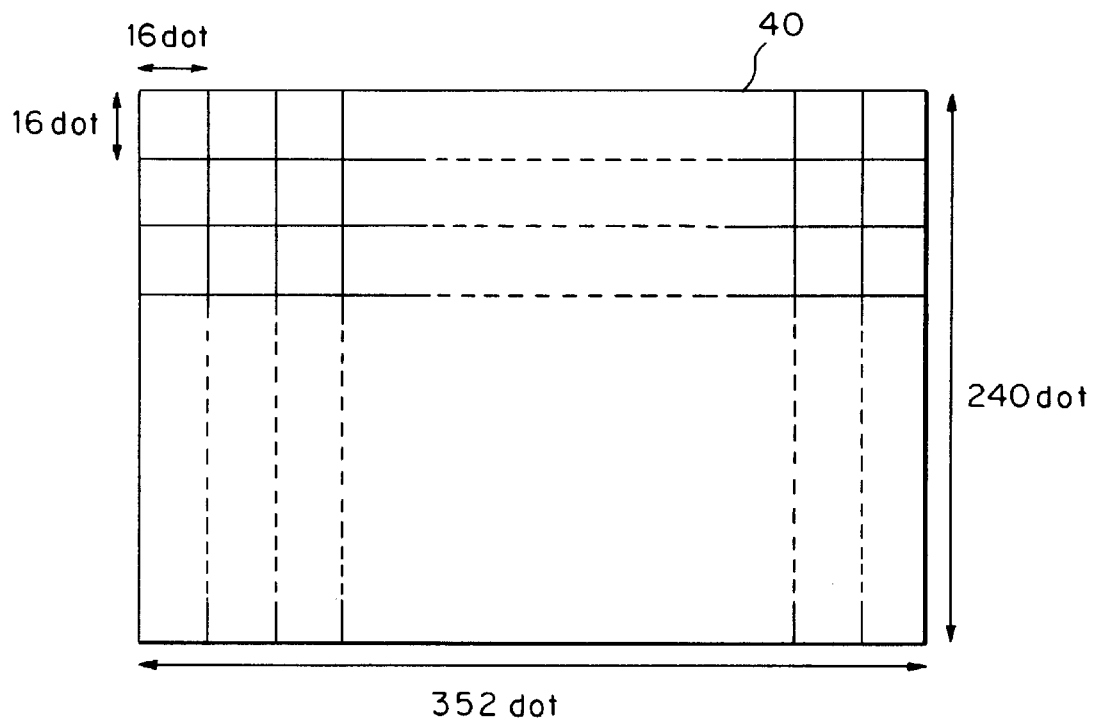
FIG. 4 is a diagram illustrating blocks constituting a picture to be processed.

First of all, at the step 25, the first picture I(1) is compressed by using the intra-picture compression technique. At that time, a 352-dot×240-dot input picture is divided into 22×15 blocks each comprising 16 dots×16 dots as shown in FIG. 4. Each of the blocks is compressed by using the intra-picture compression technique.

At the step 26, the number of times each of the intra-picture compression, differential-picture compression and skipped-block compression techniques is adopted is counted by the counter 11d and. stored in the main-memory unit 11. In the case of the picture I(1), only the intra-picture compression technique is adopted. Thus, the data for the differential-picture compression and skipped-block compression techniques is zero. The picture I(1) is preserved in the reference-picture buffer 11b of the main memory unit 11 as a reference picture.

Then, the picture B(1) is stored in the uncompressed-picture buffer 11a in the main-memory unit 11. After the picture B(1) has been stored in the uncompressed picture buffer 11a, the next picture P(1) is read in from the video apparatus 16. First of all, at the step 25, the picture P(1) to be processed is divided into blocks shown in FIG. 4. Since the picture to be compressed is a "P" picture, the differential-picture compression technique is selected for the compression using the picture I(1) stored in the preceding-reference buffer 11b.

Figure 5A:
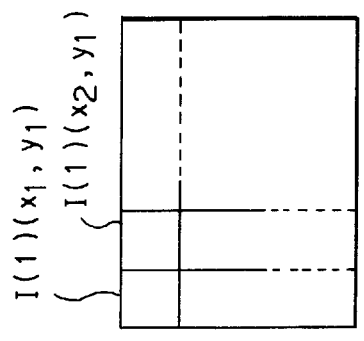
FIGS. 5A and B are explanatory diagrams used for describing a method of compressing a "P" picture.
Figure 5B:
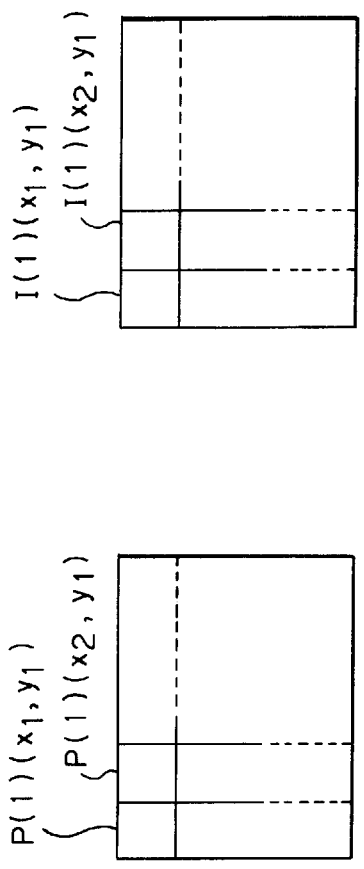

FIGS. 5a and 5b are explanatory diagrams used for describing a method of compressing a "P" picture. An image around a reference block I(1) (x1, y1) at the same location as a block P(1) (x1, y1) to be compressed is searched and a vector difference from picture elements minimizing the differential data is held as a motion vector. The amount of data undergoing the differential picture compression by using the vector value is compared with the amount of data undergoing intra-picture compression to select the smaller one. Then, the selected compression technique is recorded in the main-memory unit 11. Next, a block P(1) (x2, y1) is compressed. Much like the block P(1) (x1, y1), a motion vector is found by comparison with the reference picture. If the value is the same as the block P(1) (x1, y1), then the block P(1) (x2, y1) is skipped. Otherwise, the block P(1) (x2, y1) is coded in the same way as the block P(1) (x1, y1) by using the differential-picture compression technique or the intra-picture compression technique. As the compression of all the blocks has been completed, the picture P(1) is stored in the succeeding-reference buffer 11c.

Next, the picture B(1) stored in the main-memory unit 11 is compressed by means of the differential-picture compression technique using the reference pictures I(1) and P(1). At the step 25, the picture B(1), the object of compression, is compressed using the differential-picture compression technique by dividing the picture into blocks shown in FIG. 4. Since the picture to be compressed is a "B" picture, the differential-picture compression technique with respect to the reference pictures, the intra-picture compression technique or the skipped-block compression technique is selected.

Figure 6C:
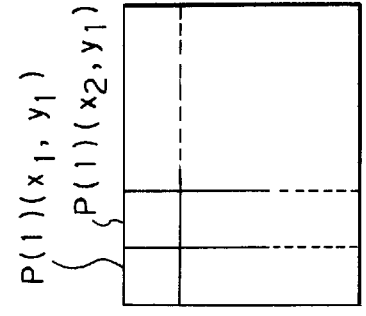
FIGS. 6A–C are explanatory diagrams used for describing a method of compressing a "B" picture.
Figure 6B:
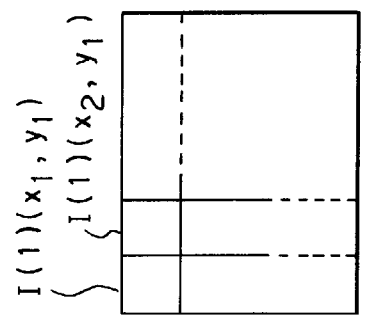
Figure 6A:
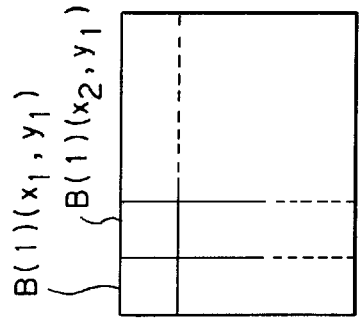

FIGS. 6a–6c are explanatory diagrams used for describing a method of compressing a "B" picture. An image around a reference block I(1) (x1, y1) at the same location as a block B(1) (x1, y1) to be compressed is searched and a vector difference from picture elements minimizing the differential data is held as a motion vector. Then, differential-picture compression is carried out. In addition, an image around a reference block P(1) (x1, y1) at the same location as the block B(1) (x1, y1) to be compressed in the figure is searched for and a vector difference from picture elements minimizing the differential data is held as a motion vector. Then, differential-picture compression is carried out. The amounts of data undergoing the differential-picture compression by using the vector values are compared with the amount of data undergoing intra-picture compression to select the small one. Then, the compressed data is stored in the file in the secondary storage device 13 and the selected compression technique is recorded in the main memory unit 11.

Next, a block B(1) (x2, y1) shown in FIG. 6a is compressed. Much like the block P(1) (x1, y1), a motion vector is found by comparison with the reference picture. If the value is the same as the block B(1) (x1, y1), then the block B(1) (x2, y1) is skipped. Otherwise, the block B(1) (x2, y1) is coded in the same way as the block B(1) (x1, y1) by selecting the differential-picture compression technique or the intra-picture compression technique. The processing is carried out repeatedly until a block B(1) (x22, y15). The number of times each of the compression techniques is used is counted and the counts are stored in the main-memory unit 11.

As the compression of all the blocks of the picture B(1) has been completed, the data of the picture P(1) stored in the succeeding-reference buffer 11c is moved to the preceding-reference Suffer 11b. Then, data of the next picture P(2) is read from the video apparatus 16.

The processings of the steps 24 to 27 are carried out as many times as pictures in one GOP. In the case of the pictures shown in FIG. 3, the compression is carried out on one picture after another in the following order: I(1), P(1), B(1), P(2), B(2), P(3), B(3), P(4), . . . . Then, user data is stored in the file in the secondary storage device 13 at a step 28.

Figure 7:
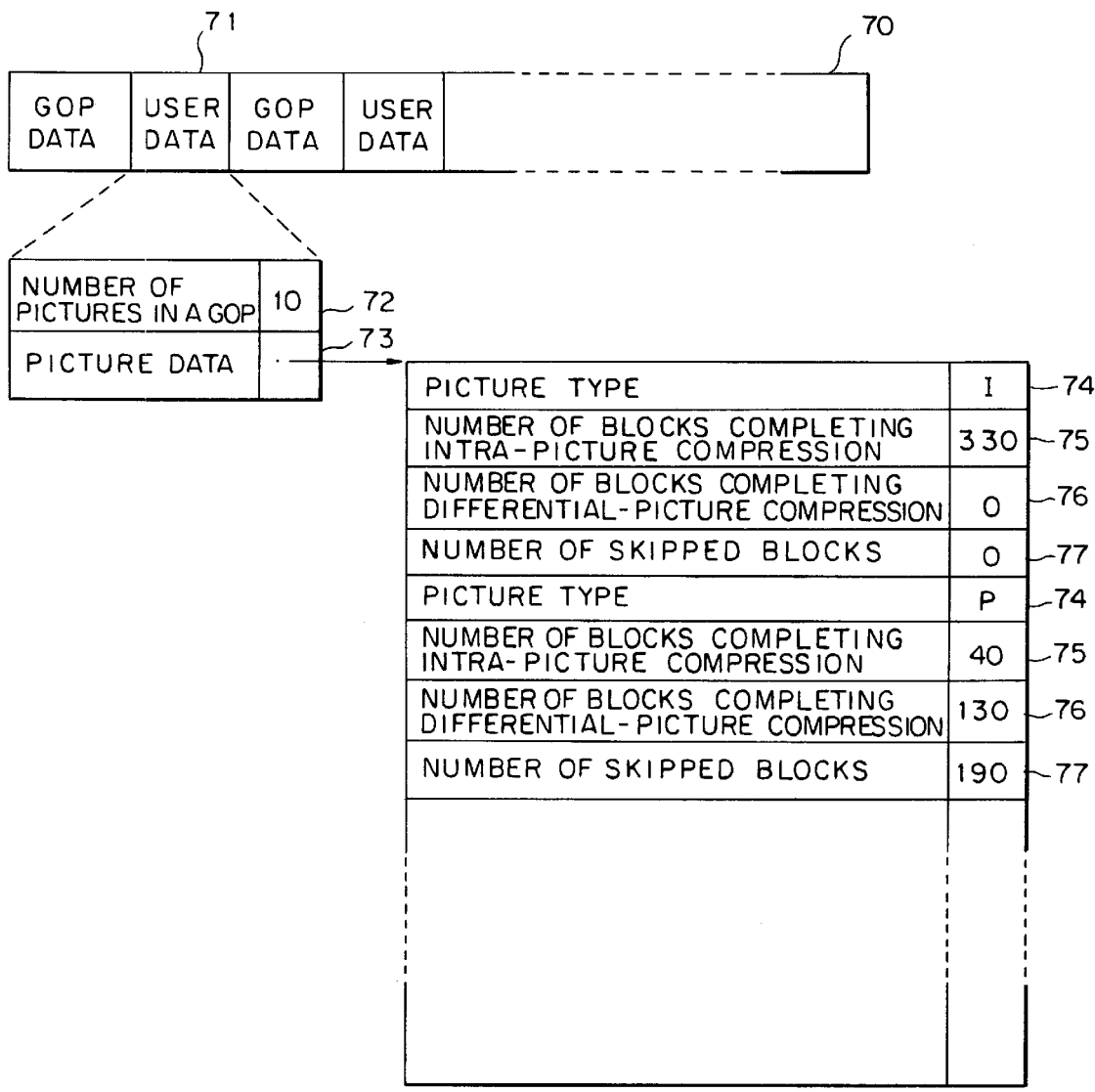
FIG. 7 is a diagram illustrating the format of compressed data of the first embodiment stored in a file in a secondary storage device.

FIG. 7 is a diagram illustrating the format of compressed data of the MPEG video stream format stored in the main-memory unit 11 at the step 26 and in the file in the secondary storage device 13 at the step 28 of FIG. 2. Data 70 shown in the FIG. 7 is a result of the processings carried out at the steps 20 to 29 shown in FIG. 2 and stored in the file in the secondary storage device 13. With data 70 data 71 is the count of the techniques for compressing blocks in the pictures which are processed and stored at the step 28 as user data after data of one GOP.

Details of the user data 71 are represented by data 72 to 77 shown in FIG. 7. In the first place, the number of pictures in each GOP is stored in the data 72. In the case of the example shown in FIG. 3, data of the 10 pictures is stored in the same order as the compression order described above. The data 73 comprises sets of data 74 to 77. The picture type, the number of blocks completing intra-picture compression, the number of blocks completing differential-picture compression and the number of skipped blocks for each picture are stored as the data 74, the data 75, the data 76 and the data 77 respectively. That is, the user data 71 includes the data 73 which comprises as many sets of data 74 to 77 as pictures described in the data 72.

The present invention, rather than operating on the MPEG video stream format illustrated in FIG. 7, can work instead using a System Stream format. The System Stream format, rather than the GOP data and user data areas, includes video, audio and private packet areas. The private packet area of the System Stream format can be used the same as the user data area of the MPEG video stream format.

Figure 8:
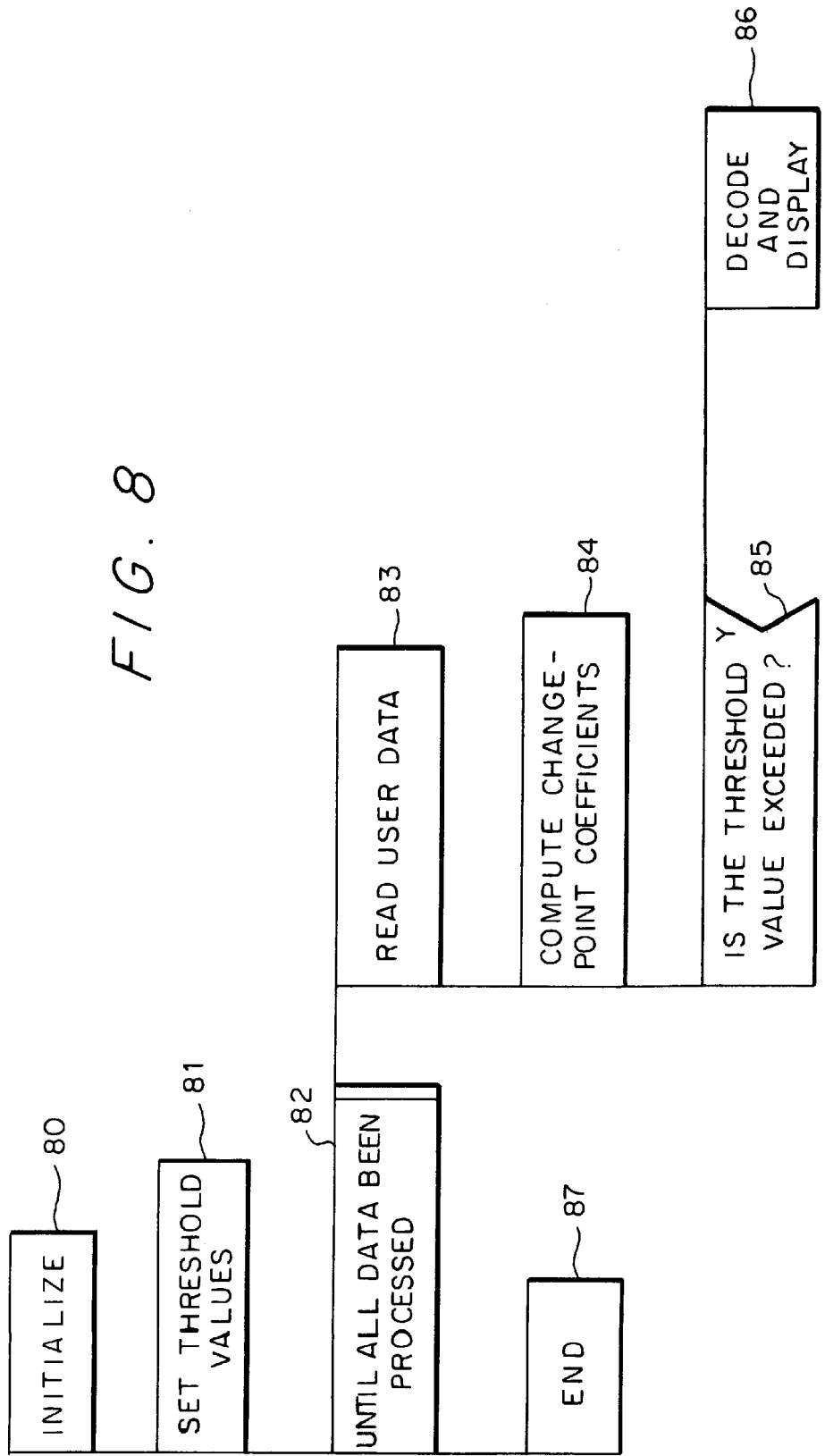
FIG. 8 is a flowchart of processing carried out by the first embodiment to detect a scene change point of a moving picture by using the data format shown in FIG. 7.

FIG. 8 is a flowchart of a processing to detect a scene change point of a moving picture by using the data format shown in FIG. 7. As shown in FIG. 8, the processing flow begins with a step 80 at which the processor 10 carries out initialization by executing a change-point detecting program in the main memory unit 11. Here, a file for storing compressed data of a moving picture of the data 70 in the secondary storage device 13 is opened. Then, the processing flow goes on to a step 81 to set threshold values d(P) and d'(B) used for detecting a scene change point. The processing flow then proceeds to a step 82 at which processings of steps 83 to 86 are carried cut repeatedly until the processing of all the data 70 is completed. In the processings, user data is retrieved and a picture exceeding the threshold value is displayed.

At the step 83, user data pertaining to each GOP defined by the format of the data 70 is read out. The processing flow then continues to the step 84 at which change-point coefficients are computed for a specific picture type. In this case, since the "I" picture undergoes only intra-picture compression, it is not used in the detection of a scene change point. As for the "B" and "P" pictures, a scene change point is detected by using the following formulas.

Formula for detecting a scene change point for a "P" picture:

$$aX(P)+bY(P)+cZ(P)>d(P)$$

Formula for detecting a scene change point for a "B" picture:

$$a'X(B)+b'Y(B)+c'Z(B)>d'(B)$$

Notations a, b, c, a', b' and c' are change-point coefficients for a block count. It should be noted that the coefficients b, c, b' and c' each have a negative value. Notations X, Y and Z are the number of blocks completing intra-picture compression, the number of blocks completing differential-picture compression and the number of skipped blocks respectively. According to the above formulas, a "P" picture with the sum of the number of blocks completing intra-picture compression, the number of blocks completing differential picture compression and the number of skipped blocks exceeding the threshold value d(P) is decoded by the decoder 18. The result of the decoding is stored in the frame memory unit 12 and displayed on a display unit 17.

By the same token, a "B" picture with the sum of the number of blocks completing intra-picture compression, the number of blocks completing differential-picture compression and the number of skipped blocks exceeding the threshold value d'(B) is decoded by the decoder 18. The result of the decoding is stored in the frame-memory unit 12 and displayed on the display unit 17.

Based on the above, in the case of a "P" picture, if the number of blocks completing intra-picture compression is large even though the number of blocks completing differential-picture compression with an "I" picture used as a reference and the number of skipped blocks are small, their sum exceeds the predetermined threshold value d(P). In this case, the image of the "P" picture is judged to be much different from that of the reference "I" picture, that is, a scene change point is judged to exist. Likewise, in the case of a "B" picture, if the number of blocks completing intra-picture compression is large even though the number of blocks completing differential-picture compression with an "I" picture and a "P" picture used as references and the number of skipped blocks are small, their sum exceeds the predetermined threshold value d'(B). In this case, the image of the "B" picture is judged to be much different from those of the reference "I" and "P" pictures, that is, a scene change point is judged to exist. Alternatively the change-point coefficients for a block count can be set by the user. In this way, by carrying out the processings of the steps 80 to 87, a desired scene change point can be displayed instantaneously.

It should be noted that the above formulas used for detecting a scene change point can be simplified by comparing only the number of blocks completing intra-picture compression of a "P" or "B" picture with a predetermined threshold value in the detection of a scene change point. In this way, the processing to detect a scene change point can be carried out in a shorter period of time. Alternatively, the simplified process for detecting a scene-change-point can be performed for a "P" picture by determining whether the difference between the number of blocks completing intra-picture compression between the "P" picture and a "B" picture exceeds a predetermined threshold value and for a "B" picture by determining whether the difference in the number of blocks completing intra-picture compression between the "B" picture and a "P" picture exceeds a predetermined threshold value. Further, the simplified process for detecting a scene change point can be performed for a "P" picture by comparing the difference between the number of blocks completing intra-picture compression of the "P" picture and a reference "P" picture exceeds a predetermined threshold value and for a "B" picture by comparing the difference between the number of blocks completing intra-picture compression of the "B" picture and a reference "B" picture exceeds a predetermined threshold value.

In addition, by carrying out the decoding processing illustrated in FIG. 8 at the same time as a fast-feed operation, a fast-feed search can be performed. By carrying out the processing described above, a scene change point can be detected and the function for detecting a scene change point can be utilized for video editing and used in an operation to search for a program.

Second Embodiment

The second embodiment is an embodiment implementing a video control system wherein, for an important scene (that is, a picture of interest) specified by the user using a video camera, change points before and after the specified important scene are detected and pictures starting with a picture at a change-start position and ending with a picture at a change-end position are displayed.

Figure 9:
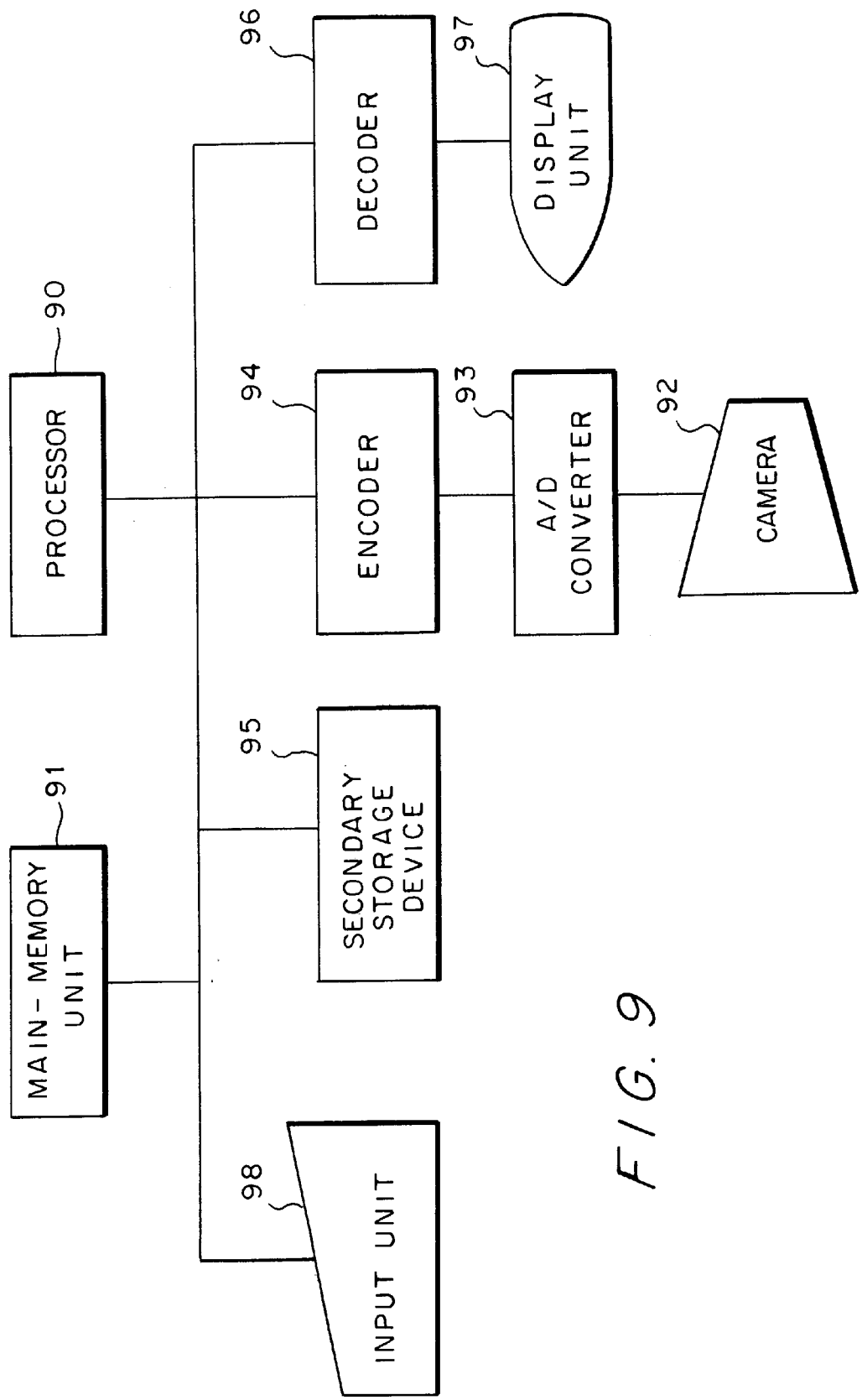
FIG. 9 is a diagram illustrating the configuration of the second embodiment provided by the present invention.

FIG. 9 is a diagram illustrating the configuration of the second embodiment provided by the present invention. To be more specific, FIG. 9 illustrates the hardware configuration of a moving-picture coding/decoding camera system as implemented by the second embodiment. Reference numeral 90 illustrated in FIG. 9 is a processor for controlling operations of other components in the moving-picture coding/decoding camera system. The processor 90 executes control in accordance with a program stored in a main-memory unit 91. Reference numeral 92 is a camera for taking a picture and reference numeral 93 is an A/D converter for converting an analog video signal output by the camera 92 into digital data to be supplied to an encoder 94. The encoder 94 compresses the digital data supplied thereto and then stores the compressed data into a file in a secondary storage device 95. The moving-picture data encoded by the encoder 94 and stored in the file in the secondary storage device 95 is decoded by a decoder 96 and displayed on a display unit 97. An input unit 98 is used for entering commands for requesting the camera 92 to start video recording, specify the position of a picture of interest and halt the video recording.

Figure 10:
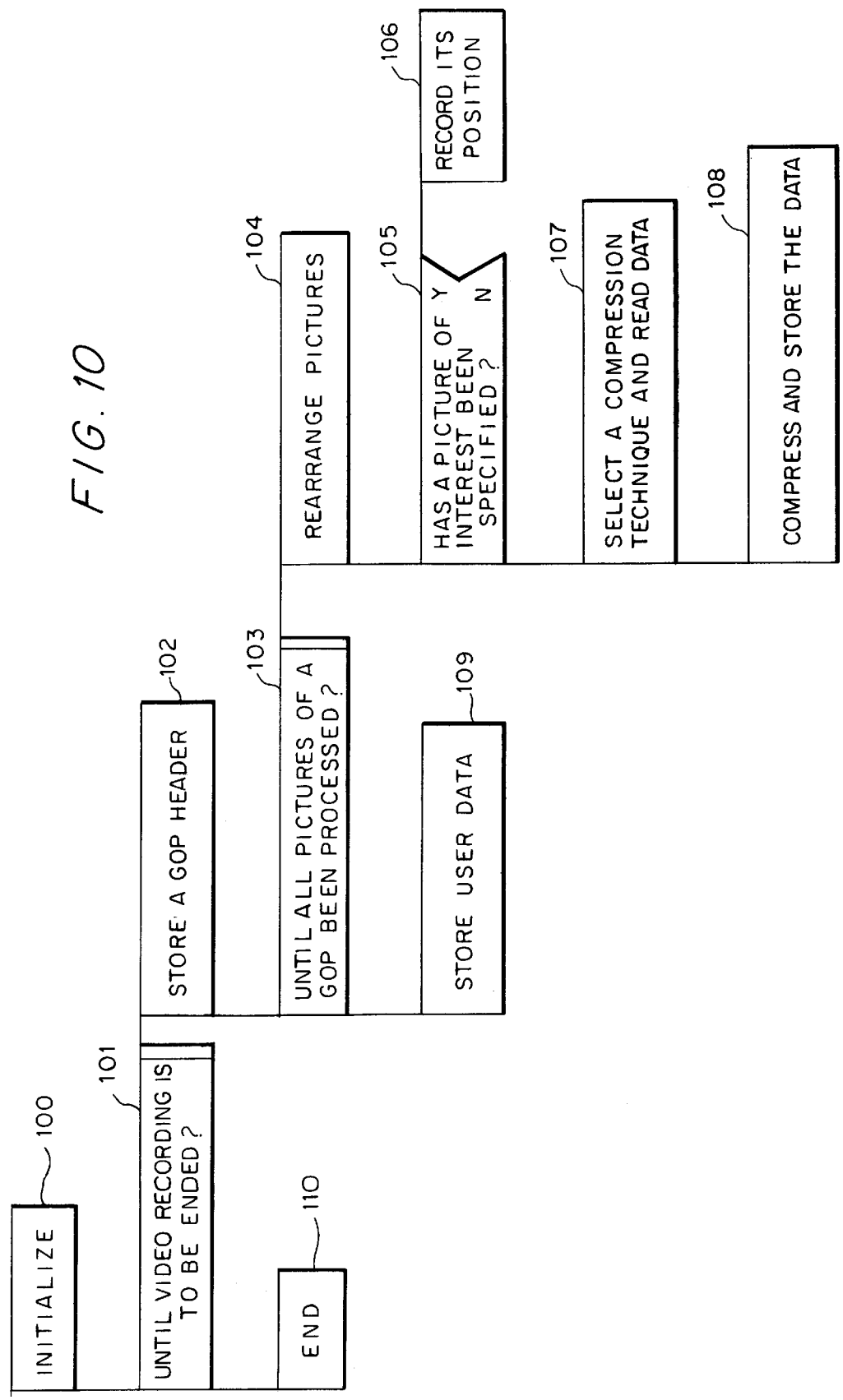
FIG. 10 is a flowchart of processing carried out by the second embodiment in order to compress a picture.

FIG. 10 is a flowchart of processing carried out by the present embodiment in order to compress a picture. As illustrated in FIG. 10 the flowchart begins with a step 100 at which a program in the main-memory unit 91 is executed for controlling the encoder 94 and a file in the secondary storage device 95 for storing a compressed picture is opened. Processings are carried out at steps 101 to 109 to store a compressed picture in the file in the secondary storage device 95.

At the step 102, the header of a GOP is stored in the file in the secondary storage device 95 in response to a request to start video recording received from the input unit 98. The processing flow then goes on to step 103 at which images of a number of pictures constituting a GOP are input from the camera 92 and the A/D converter 93 and then compressed by the encoder 94. The main processing procedure of the compression is the same as the steps 24 to 27 of the first embodiment described above.

The processing flow then proceeds to step 104 at which pictures to be compressed are rearranged. The pictures are then compressed in a picture compression order as is the case with the first embodiment described above by referring to FIG. 3. The processing flow then continues to a step 105 at which an input received from the input unit 98 is evaluated before compressing a picture. If the input received from the input unit 98 specifies the position of a picture of interest, the processing flow goes on to step 106 at which the position of the picture of interest in the GOP is stored in the main-memory unit 91. For example, if the picture P(2) shown in FIG. 3 has been specified as a picture of interest, the position thereof, for example, #5, is recorded in the main-memory unit 91.

At step 107, the compression technique is selected for each block. The processing flow then goes on to the step 108 at which the selected compression technique is stored in the main-memory unit 91 and compressed data is stored in the file in the secondary storage device 95. As the processings of the steps 104 to 108 are completed, the processing flow proceeds to step 109 at which the compression technique for each block of each picture and the position of the picture of interest are stored in the file in the secondary storage device 95 as user data. The proceed,sings of the steps 103 to 109 are carried out repeatedly until a request to halt the video recording is received from the input unit 98. The processing flow then continues to step 110 at which the opened file in the secondary storage device 95 is closed, finishing the processings.

Figure 11:
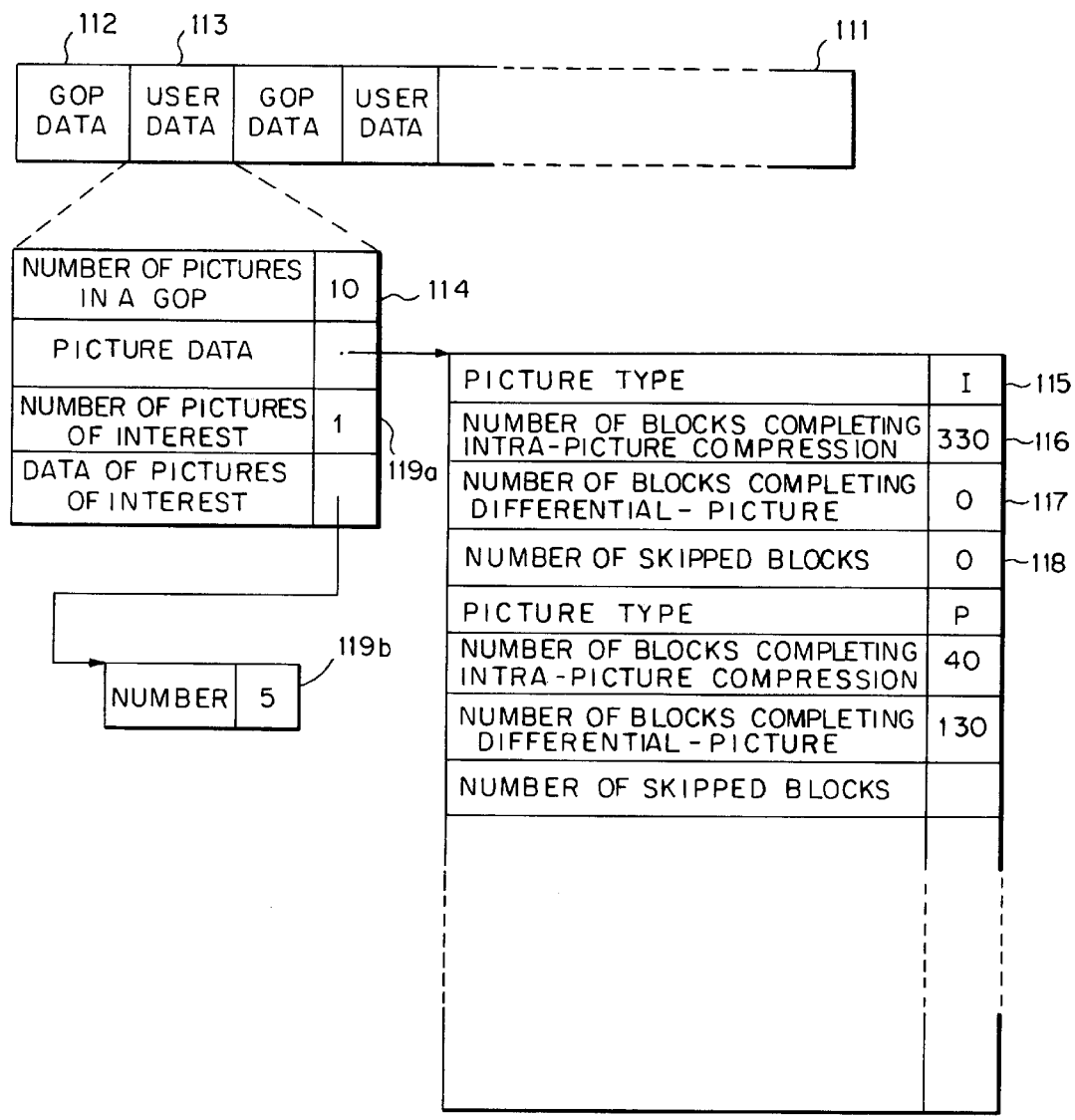
FIG. 11 is a diagram illustrating an example of data of the second embodiment stored in a file in a secondary storage device.

FIG. 11 is a diagram illustrating an example of data 111 stored in the file in the secondary storage device 95 at the step 109. The data 111 is compressed data of a moving picture stored in the file in the secondary storage device 95 by the processings carried out at the steps 100 to 110.

As illustrated in FIG. 11, the data 111 comprises data 112 of one GOP and user data 113 for the GOP.

Details of the user data 113 are represented by data 114 to 119*b* shown in FIG. 11. Much like the first embodiment shown in FIG. 7, the number of pictures in each GOP is stored in the data 114. The picture data comprises sets of data 115 to 118. The picture type, the number of blocks completing intra-picture compression, the number of blocks completing differential-picture compression and the number of skipped blocks for each picture are stored as the data 115, the data 116, the data 117 and the data 118 respectively. That is to say, the user data 113 includes the picture data which comprises as many sets of data 115 to 118 as pictures described in the data 114.

Data 119a is the number of pictures of interest in the GOP. If the number of pictures of interest 119a is 1 or greater, the storage positions of the pictures of interest in the GOP are stored in data 119b as numbers representing the positions. In the case of the example shown in FIG. 3, if the picture P(2) is specified as a picture of interest, #5 indicating the storage position thereof is recorded in the data 119b.

FIG. 12 is a flowchart of a processing to detect a scene change point of a moving picture by using the data format shown in FIG. 11. As shown in FIG. 12, the processing flow begins with a step 120 at which the processor 90 carries out initialization by executing a change-point detecting program in the main memory unit 91. Here, a file in the secondary storage device 95 for storing compressed data of a moving picture of the data 111 is opened. Then, the processing flow goes on to a step 121 to set threshold values d(P) and d'(B) used for detecting a scene change point. The processing flow then proceeds to a step 122 at which processings of steps 123 to 127 are carried out repeatedly until the processing of all the data 111 is completed. In the processings, user data is retrieved and a picture of interest is detected. At the same time, scene change points in close proximity to the picture of interest are detected and pictures starting with a picture at a change start point and ending with a picture at a change end point are displayed.

At the step 123, user data pertaining to each GOP defined by the format of the data 111 is read out sequentially to search for a picture of interest. The processing flow then continues to the step 124 to find out if the number of pictures of interest in the data 119a is 1 or greater. If the number of pictures of interest in the data 119a is found equal to 1 or greater, the storage positions (the numbers) of the pictures of interest are set in a GOP counter in the main-memory unit 91.

The processing flow then goes on to the step 125 at which a preceding scene change point is detected from the detected picture of interest by decrementing the contents of the GOP counter by one. The preceding scene change point is detected in the same way as the first embodiment. That is to say, since the "I" picture does not undergo differential-picture compression, it is not used in the detection of a scene change point. As for the "B" and "P" pictures, a scene change point is detected by using the following formulas.

Formula for detecting a scene change point for a "P" picture:

$$aX(P)+bY(P)+cZ(P)>d(P)$$

Formula for detecting a scene change point for a "B" picture:

$$a'X(B)+b'Y(B)+c'z(B)>d'(B)$$

Notations a, b, c, a', b' and c' are change-point coefficients for a block count. It should be noted that the coefficients b, c, b' and c' each have a negative value. Notations X, Y and Z are the number of blocks completing intra-picture compression, the number of blocks completing differential-picture compression and the number of skipped blocks respectively.

In the example described above, the data 119b is the storage #5, that is, the picture P(2) is a picture of interest. In this case, the contents of the GOP counter are decremented by one to 4 and the formula of a "B" picture is evaluated for the picture B(2) of the storage #4. The contents of the GOP counter are again decremented by one to 3 then to 2 and so on arid the formula is evaluated for the picture P(1) of the storage #3 and then for the picture B(1) of the storage #2 and so on. If the result of the evaluation indicates that the value of the expression on the left-hand side of the formula is greater than the threshold values d(P) or d'(B), the picture in question is detected as a preceding scene change point. In this case, the storage position of the detected picture in the GOP is recorded in the main-memory unit 91 as a change start position of the picture of interest.

The processing flow then goes on to the step 126 at which the contents of the GOP counter are restored to #5, the storage position of the picture of interest. This time, however, a succeeding scene change point is detected from the detected picture of interest by decrementing the contents of the GOP counter by one. A succeeding scene change point is detected in the same way as the preceding scene change point described above. When a succeeding scene change point is detected, the storage position of the detected picture in the GOP is recorded in the main-memory unit 91 as a change end position of the picture of interest.

The processing flow then goes on to the step 127 at which a compressed moving picture starting with a picture at the change start position and ending with a picture at the change end position of the picture of interest is decoded by the decoder 96 and then displayed on the display unit 97. In this way, the processings described above allow a moving picture in close proximity to a position recorded as a picture of interest to be displayed.

A scene change detection program corresponding to the flowchart illustrated in FIG. 8 is provided by the present invention. The scene change detection program can be stored on a storage medium such as a floppy disk, CD ROM or computer memory so as to be executable by a computer. The storage medium may also be a memory of a server connected to a network which transfers the change detection program from the memory of the server to the memory of a computer connected to the network.

As described above, according to the present invention, when compressing moving-picture data by dividing a picture into small block units and selecting an intra-picture compression technique, a differential-picture compression technique or a skipped-block compression technique for each of the block units, the selected compression techniques are recorded as user data. Recording such a user data allows a scene change point of a moving picture to be detected from the number of times the selected compression techniques are used for compressing the blocks constituting the moving picture. In this way, video data can be searched for items to be edited with ease and, at the same time, it is also possible to search the video data for a desired program and to create digest data easily.

While the present invention has been described in detail and pictorially in the accompanying drawings it is not limited to such details since many changes and modifications recognizable to those of ordinary skill in the art may be made to the invention without departing from the spirit and the scope thereof.

I claim:

1. A scene-change-point detecting method for detecting a scene change point in a moving picture which has been coded according to a moving-picture coding process of dividing said moving picture into groups of pictures each having a first picture to undergo intra-picture compression, a plurality of second pictures each to undergo forward differential-picture compression, wherein differences between each second picture and a timewise preceding encoded picture are compressed and a plurality of third pictures each to undergo forward/backward differential-picture compression wherein differences between each third picture and a timewise preceding encoded picture and a timewise succeeding encoded picture are compressed, dividing each of said pictures into blocks each having a predetermined size, and encoding each of said blocks by one of said intra-picture compression, said forward differential picture compression arid said forward/backward differential picture compression, said scene-change-point detecting method comprising the steps of:

counting the number of blocks in a picture completing said differential-picture compression, counting the number of blocks in said picture completing said intra-picture compression and counting the number of blocks in said picture completing no compression; and detecting whether a scene change point exists in said picture based on the counts.

2. A scene-change-point detecting method according to claim 1, wherein said detecting step comprises the step of:

determining a scene-change-point by comparing the count of the number of blocks in said picture completing said intra-picture compression to a threshold value.

3. A scene-change-point detecting method according to claim 1, wherein information required for detection of a scene change point including the counts are recorded as user data.

4. A moving-picture editing/displaying method for editing and displaying a moving picture by decoding, editing and displaying a stored, compressed and coded moving picture, said moving picture being coded according to a moving-picture coding process of dividing said moving picture into groups of pictures each having a first picture to undergo intra-picture compression, a plurality of second pictures each to undergo four differential-picture compression, wherein differences between each second picture and a timewise preceding encoded picture are compressed, and a plurality of third pictures each to undergo forward/backward differential-picture compression, wherein differences between each third picture and timewise proceeding encoded picture and a timewise succeeding encoded picture are compressed, dividing each of said pictures into blocks each having a predetermined size, and encoding each of said blocks by one of said intra-picture compression, said forward differential picture compression and forward/backward differential picture compression, said moving-picture editing/displaying method comprising the steps of:

specifying a picture position in said moving picture;

searching said moving picture for said specified picture position in a process of decoding said stored, compressed and coded moving picture;

detecting a scene change point preceding said picture position and a scene change point succeeding said picture position, said detecting step comprises the steps of:

counting the number of blocks in a picture completing said differential-picture compression, counting the number of blocks in said picture completing said intra-picture compression, and counting the number of blocks in said picture completing no compression; and detecting whether a scene-change-point exists in said picture based on the counts; and displaying pictures starting with a picture at said scene change point preceding said picture position and ending with a picture at said scene change point succeeding said picture position.

5. A moving-picture editing/displaying method according to claim 4, wherein information required for detection of a scene change point including the counts are recorded as user data.

6. A moving-picture editing/displaying method according to claim 4, wherein said detecting step comprises the step of:

determining a scene-change-point by comparing the count of the number of blocks in said picture completing said intra-picture compression to a threshold value.

7. A scene-change-point detection apparatus for detecting a scene change point in a moving picture which has been coded by a moving-picture compression system according to a moving-picture coding process of dividing said moving picture into groups of pictures each having a first picture to undergo intra-picture compression, a plurality of second pictures each to undergo forward differential-picture compression, wherein differences between each second picture and a timewise preceding encoded picture are compressed and a plurality of third pictures each to undergo forward/backward differential-picture compression wherein differences between each third picture and a timewise preceding encoded picture and a timewise succeeding encoded picture are compressed, dividing each of said pictures into blocks each having a predetermined size, and encoding each of said blocks by one of said intra-picture compression, said forward differential picture compression and said forward/backward differential picture compression, said scene-change-point detection apparatus comprising:

means for counting the number of blocks in a picture completing said differential-picture compression, counting the number of blocks in said picture completing said intra-picture compression and counting the number of blocks in said picture completing no compression; and means for detecting whether a scene change point exists in said picture based on the counts.

8. A scene-change-point detection apparatus according to claim 7, wherein information required for detection of a scene change point including the counts are recorded as user data.

9. A scene-change-point detection apparatus according to claim 7 and said scene-change-point detection apparatus is a circuit board having a plurality of integrated circuits interconnected thereon.

10. A scene-change-point detection apparatus according to claim 7, wherein said scene-change-point detection apparatus is a semiconductor integrated circuit chip.

11. A scene-change-point detection apparatus according to claim 7, wherein said detecting means comprises:

means for determining a scene-change-point by comparing the count of the number of blocks in said picture completing said intra-picture compression to a threshold value.

12. A moving-picture editing/displaying system for editing and displaying a moving picture by decoding, editing and displaying a stored, compressed and coded moving picture, said moving picture being coded according to a moving-picture coding process of dividing said moving picture into groups of pictures each having a first picture to undergo intra-picture compression, a plurality of second pictures each to undergo four differential-picture compression, wherein differences between each second picture and a timewise preceding encoded picture are compressed, and a plurality of third pictures each to undergo forward/backward differential-picture compression, wherein differences between each third picture and timewise proceeding encoded picture and a timewise succeeding encoded picture are compressed, dividing each of said pictures into blocks each having a predetermined size, and encoding each of said blocks by one of said intra-picture compression, said forward differential picture compression and forward/backward differential picture compression, said moving-picture editing/displaying system comprising:

means for specifying a picture position in said moving picture;

means for searching said moving picture for said specified picture position in a process of decoding said stored, compressed and coded moving picture;

means for detecting a scene change point preceding said picture position and a scene change point succeeding said picture position, said detecting means comprises:

means for counting the number of blocks in a picture completing said differential-picture compression, counting the number of blocks in said picture completing said intra-picture compression, and counting the number of blocks in said picture completing no compression, and means for detecting whether a scene-change-point exists in said picture based on the counts; and means for displaying pictures starting with a picture at said scene change point preceding said picture position and ending with a picture at said scene change point succeeding said picture position.

13. A moving-picture editing/displaying system according to claim 12, wherein information required for detection of a scene change point including the counts are recorded as user data.

14. A moving-picture editing/displaying system according to claim 12, wherein said detecting means further comprises:

means for determining a scene-change-point by comparing the count of the number of blocks in said picture completing said intra-picture compression to a threshold value.

15. A moving-picture editing/displaying system according to claim 12, wherein said moving-picture editing/displaying system is a video camera.

16. A moving-picture editing/displaying system according to claim 12, wherein said moving-picture editing/displaying system is a video tape recorder.

17. A computer program stored on a storage medium for detecting a scene change point in a moving picture which has been coded according to a moving-picture coding process of dividing said moving picture into groups of pictures each having a first picture to undergo intra-picture compression, a plurality of second pictures each to undergo forward differential-picture compression, wherein differences between each second picture and a timewise preceding encoded picture are compressed and a plurality of third pictures each to undergo forward/backward differential-picture compression wherein differences between each third picture and a timewise preceding encoded picture and a timewise succeeding encoded picture are compressed, dividing each of said pictures into blocks each having a predetermined size, and encoding each of said blocks by one of said intra-picture compression, said forward differential picture compression and said forward/backward differential picture compression, said computer program when executed by a computer causes said computer to perform the steps of:

counting the number of blocks in a picture completing said differential-picture compression, counting the number of blocks in said picture completing said intra-picture compression and counting the number of blocks in said picture completing no compression; and detecting whether a scene change point exists in said picture based on the counts.

18. A computer program according to claim 17, wherein information required for detection of a scene change point including the counts are recorded as user data.

19. A computer program according to claim 17, wherein said detecting step comprises the step of:

determining a scene-change-point by comparing the count of the number of blocks in said picture completing said intra-picture compression to a threshold value.

20. A computer program stored on a storage medium for editing and displaying a moving picture by decoding, editing and displaying a stored, compressed and coded moving picture, said moving picture being coded according to a moving-picture coding process of dividing said moving picture into groups of pictures each having a first picture to undergo intra-picture compression, a plurality of second pictures each to undergo four differential-picture compression, wherein differences between each second picture and a timewise preceding encoded picture are compressed, and a plurality of third pictures each to undergo forward/backward differential-picture compression, wherein differences between each third picture and timewise proceeding encoded picture and a timewise succeeding encoded picture are compressed, dividing each of said pictures into blocks each having a predetermined size, and encoding each of said blocks by one of said intra-picture compression, said forward differential picture compression and forward/backward differential picture compression, said computer program when executed by a computer causes said computer to perform the steps of:

specifying a picture position in said moving picture;

searching said moving picture for said specified picture position in a process of decoding said stored, compressed and coded moving picture;

detecting a scene change point preceding said picture position and a scene change point succeeding said picture position, said detecting step comprises the steps of:

counting the number of blocks in a picture completing said differential-picture compression, counting the number of blocks in said picture completing said intra-picture compression, and counting the number of blocks in said picture completing no compression, and detecting whether a scene-change-point exists in said picture based on the counts; and displaying pictures starting with a picture at said scene change point preceding said picture position and ending with a picture at said scene change point succeeding said picture position.

21. A computer program according to claim 20, wherein information required for detection of a scene change point including the counts are recorded as user data.

22. A computer program according to claim 20, wherein said detecting step comprises the step of:

determining a scene-change-point by comparing the count of the number of blocks in said picture completing said intra-picture compression to a threshold value.

23. A computer program according to claim 20, wherein said storage medium is a memory included in a server connected to a network, and wherein said server transfers said computer program from said memory included in said server to a memory included in a computer connected to said network.

24. data structure, stored on a machine readable storage medium, said data structure when operated on causes a scene-change-point detection apparatus to detect a scene change point in a moving picture which has been coded according to a moving-picture coding process of dividing said moving picture into groups of pictures each having a first picture to undergo intra-picture compression, a plurality of second pictures each undergo forward differential-picture compression, wherein differences between each second picture and a timewise preceding encoded picture are compressed, and a plurality of third pictures each to undergo forward/backward differential-picture compression, wherein differences between each third picture and a timewise preceding encoded picture and a timewise succeeding encoded picture are compressed, dividing each of said pictures into blocks each having a predetermined size, and encoding each of said blocks by one of said intra-picture compression, said forward differential picture compression and said forward/backward differential picture compression, said data structure comprising:

a first count of the number of blocks in a picture completing said differential-picture compression;

a second count of the number of blocks in said picture completing said intra-picture compression, a third count of the number of blocks in said picture completing no compression, wherein said scene-change-point detection apparatus detects whether a scene change point exists in said picture based on the counts.

25. A data structure according to claim 23, wherein said scene-change-point detection apparatus determines a scene-change-point by comparing the count of the number of blocks in said section completing said intra-picture compression to a threshold value.

26. A data structure according to claim 23, wherein information required for detection of a scene-change-point including the counts are recorded as user data.

* * * * *